United States Patent
Magendanz et al.

(10) Patent No.: US 7,136,042 B2
(45) Date of Patent: *Nov. 14, 2006

(54) DISPLAY CONTROLLER PERMITTING CONNECTION OF MULTIPLE DISPLAYS WITH A SINGLE VIDEO CABLE

(75) Inventors: Chad L. Magendanz, Issaquah, WA (US); William J. Westerinen, Sammamish, WA (US); Dawson Yee, Clyde Hill, WA (US); William Chambers Powell, III, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 340 days.

This patent is subject to a terminal disclaimer.

(21) Appl. No.: 10/284,045

(22) Filed: Oct. 29, 2002

(65) Prior Publication Data

US 2004/0080482 A1   Apr. 29, 2004

(51) Int. Cl.
*G09G 3/36* (2006.01)
*G09G 5/00* (2006.01)

(52) U.S. Cl. .................. 345/100; 345/1.1; 345/3.1
(58) Field of Classification Search ............. 345/100, 345/103, 1.1–1.3, 3.1–3.4
See application file for complete search history.

(56) References Cited

U.S. PATENT DOCUMENTS

| | | | |
|---|---|---|---|
| 5,067,021 A | 11/1991 | Brody ................... 358/241 |
| 5,661,531 A | 8/1997 | Greene et al. | |
| 5,668,569 A | 9/1997 | Greene et al. | |
| 5,889,568 A | 3/1999 | Seraphim et al. | |
| 6,104,414 A * | 8/2000 | Odryna et al. .......... 345/1.3 |
| 6,188,454 B1 | 2/2001 | Greene et al. | |
| 6,262,696 B1 | 7/2001 | Seraphim et al. | |
| 6,302,612 B1 | 10/2001 | Fowler et al. ............ 403/76 |
| 6,456,354 B1 | 9/2002 | Greene et al. | |
| 6,483,482 B1 | 11/2002 | Kim .................... 345/3.1 |
| 6,587,082 B1 | 7/2003 | Moore .................. 345/1.3 |
| 6,774,868 B1 * | 8/2004 | Bowen ................. 345/1.3 |
| 6,819,304 B1 * | 11/2004 | Branson ............... 345/1.3 |
| 6,859,219 B1 | 2/2005 | Sall ..................... 345/905 |
| 2001/0011965 A1 | 8/2001 | Wilks .................. 345/1.1 |
| 2002/0021258 A1 | 2/2002 | Koenig ................ 345/1.1 |
| 2002/0130821 A1 | 9/2002 | Bronson ................. 345/8 |
| 2002/0167459 A1* | 11/2002 | Baudisch et al. ........ 345/1.3 |
| 2004/0150581 A1* | 8/2004 | Westerinen et al. ...... 345/1.3 |
| 2004/0222941 A1 | 11/2004 | Wong et al. ........... 345/1.1 |

FOREIGN PATENT DOCUMENTS

WO    WO 99/66716    12/1999

* cited by examiner

*Primary Examiner*—Jimmy H. Nguyen
(74) *Attorney, Agent, or Firm*—Woodcock Washburn LLP (57) ABSTRACT

A display controller that permits more than one display to be operated by a single cable and a single display adapter. The display controller provides custom EDID information to a computer to which it is attached. The custom EDID information may include information about the single virtual display surface provided by all displays, and may include information about each of the individual monitors or displays, including the location of the individual displays in the single composite display surface. The single composite display surface may be utilized by computers that are not capable of recognizing the EDID for the multiple display system. If the computer does recognize the EDID for the multiple display system, the operating system of the computer and/or applications running on the computer may understand and utilize the heterogeneous nature of the display surface and may optimize display quality and presentation for a user.

19 Claims, 9 Drawing Sheets

DISPLAY CONTROLLER PERMITTING CONNECTION OF MULTIPLE DISPLAYS WITH A SINGLE VIDEO CABLE

TECHNICAL FIELD OF THE INVENTION

The present invention is generally directed to computers, and more specifically directed to a computer having more than one display.

BACKGROUND OF THE INVENTION

The use of multiple displays by computer enthusiasts continues to grow. Using more than one display allows a user to stretch his or her desktop to show more programs than if a single display is used. In addition, a single program may be stretched over multiple displays so that more of a document, such as a spreadsheet, may be seen without scrolling. A presentation may also be opened over several pages and may be dragged across several different displays.

Because of the cost of producing large displays, purchasing two displays may provide the same amount of desktop space for less price than a large monitor. In addition to the cost of the monitor itself, however, conventional multiple monitor systems require an additional cable and display adapter, usually in the form of a video card, for each monitor. Alternatively, a special video card, often called a "dualhead" or multi-display card, must be purchased for the computer. Adding or changing the video cards requires opening the computer box and some knowledge of the internal structure of the computer. Moreover, the cables and video cards must be configured correctly by a user to create a single virtual display surface.

A drawback to the use of multiple monitors is that visually scanning from one monitor to another may be difficult. The wide frame that extends around the display for most monitors interrupts the eye when a user scans from one monitor to another, even when the monitors are placed as closely together as possible.

SUMMARY OF THE INVENTION

The present invention provides a display controller that permits more than one display to be driven by a single cable and a single display adapter. To this end, the display controller divides a single frame of information that is provided by a display adapter into display information for the multiple displays.

The present invention may be used with combinations of many different types of displays, including but not limited to monitors, LCD displays, and any combination thereof. In addition, the present invention may be utilized for multiple displays within a single housing. The multiple displays may be separate panels arranged in a housing to form a large contiguous display surface, for example.

The display controller provides information about the display to a computer to which it is attached (for example via a known mechanism such as custom EDID). The custom EDID information may include information about the single virtual display surface provided by all displays, such as the size, resolution and refresh rate for the combined displays. In addition, the EDID information may include information about each of the individual monitors or displays, including the location of the individual displays in the single virtual display surface, and available resolutions and refresh rates for each of the monitors. The single virtual display surface may be utilized by computers that are not capable of recognizing the EDID for the multiple display system.

If the computer does recognize the EDID for the multiple display system, the operating system of the computer and/or applications running on the computer may understand and utilize the heterogeneous nature of the display surface and may optimize display quality and presentation for a user. To this end, an application programming interface (API) may be provided that exposes itself to applications so that the applications may be aware of the multiple displays and alter their images so that one or more particular panes are shown on a particular display or across multiple displays.

Operating systems that are aware of the EDID for the multiple display system may use a display component, such as a video driver, to expose the virtual display surfaces of each of the displays that are attached to the display controller. The applications or the operating system may then provide the image information for the virtual display surfaces.

The virtual display surfaces are combined to form a single frame in the frame buffer of the display adapter. The frame is forwarded to the display controller, which divides the image, for example using line or frame buffers, and then provides appropriate display information to the separate displays. For some implementations of the invention, the display data frame for a target display may be rotated so that it matches the scanning direction of the target display.

Other advantages will become apparent from the following detailed description when taken in conjunction with the drawings, in which:

DETAILED DESCRIPTION

Exemplary Operating Environment

Figure 1:
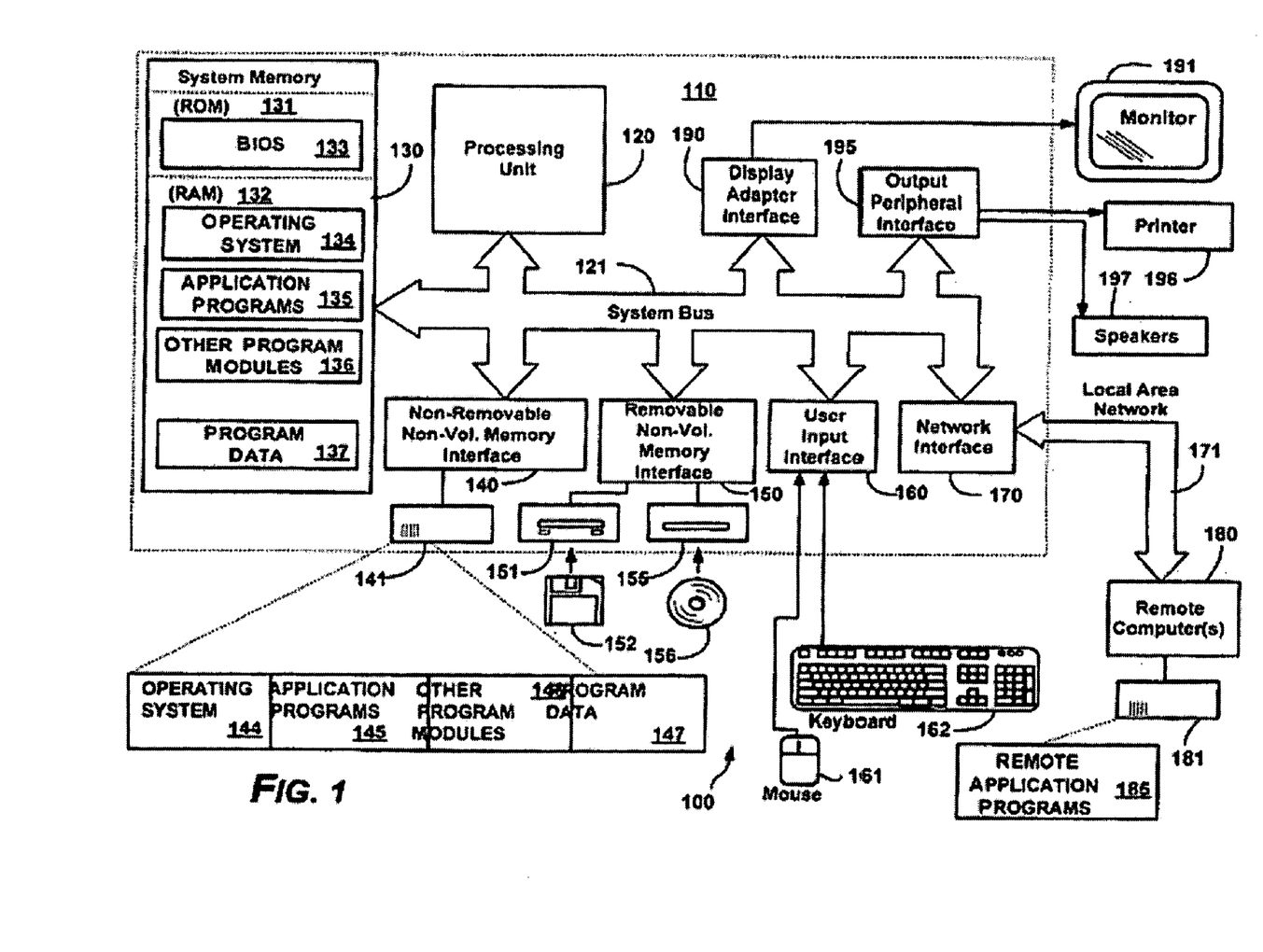
FIG. 1 is a block diagram representing a computer system into which the present invention may be incorporated.

FIG. 1 illustrates an example of a suitable computing system environment 110 on which the invention may be implemented. The computing system environment 110 is only one example of a suitable computing environment and is not intended to suggest any limitation as to the scope of use or functionality of the invention. Neither should the computing environment 110 be interpreted as having any dependency or requirement relating to any one or combination of components illustrated in the exemplary operating environment 110.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microcontroller-based systems, set top boxes, programmable consumer electronics, network PCs, minicomputers, mainframe computers, digital television, simulator systems, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general-purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, CD-RW, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media, or writeable/re-writeable optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules, and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a keyboard 162 and pointing device 161, commonly referred to as a mouse, trackball, or touch pad. Other input devices (not shown) may include a microphone, joystick, game pad, satellite dish, scanner, a touch-sensitive screen of a handheld PC or other writing tablet, or the like. These and other input devices are often connected to the processing unit 120 through a user input interface 160 that is coupled to the system bus, but may be connected by other interface and bus structures, such as a parellel port, game port or a universal serial bus (USB). A monitor 191 or other type of display device is also connected to the system bus 121 via an interface, such as a display adapter interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) (not shown, but known), but may also include other networks. Such networking environments are commonplace in offices, enterprise-wide computer networks, intranets and the Internet.

When used in a LAN networking environment, the computer 110 is connected to the LAN 171 through a network interface or adapter 170. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Connecting Multiple Displays to a Computer with a Single Graphics Card

Figure 2:
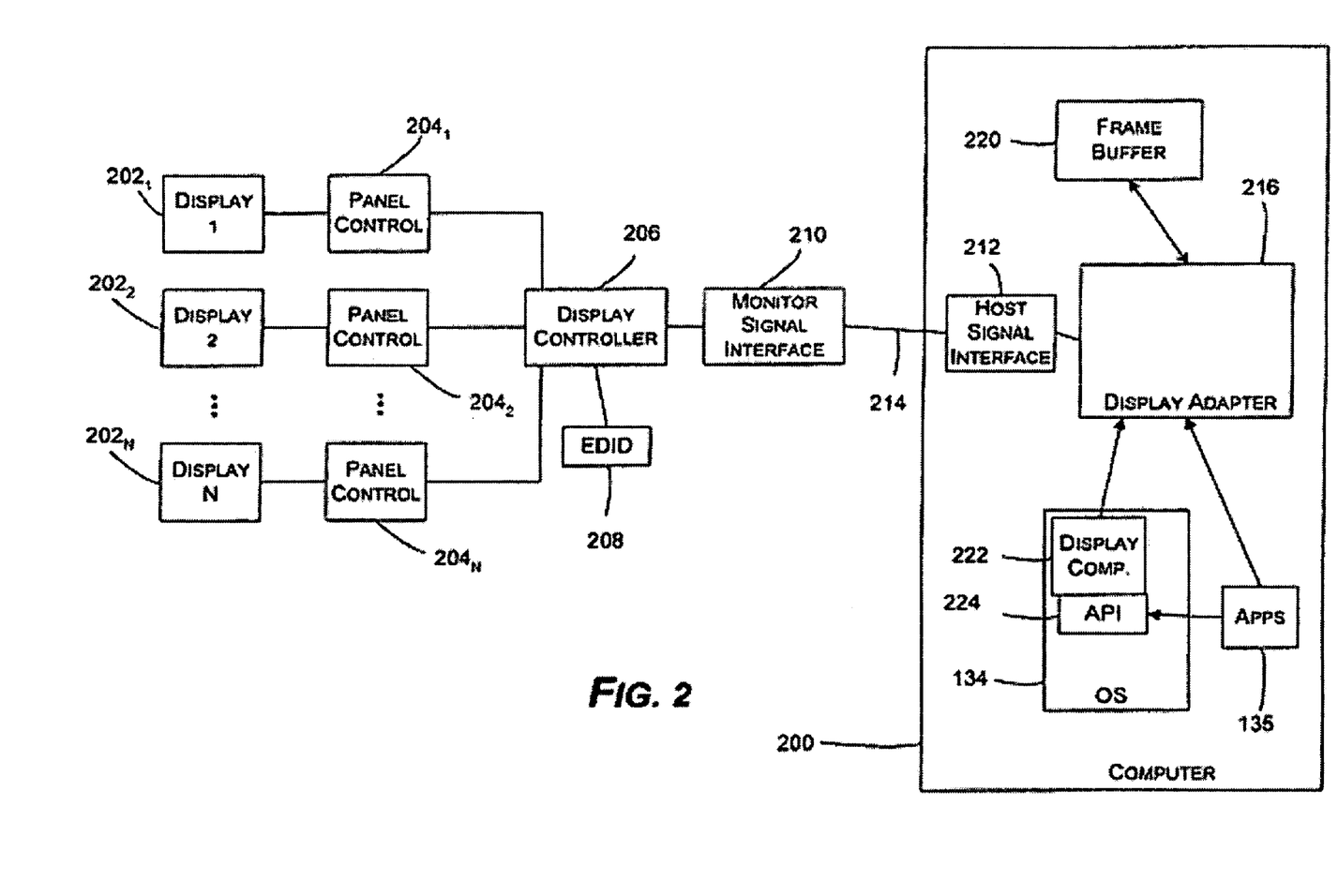
FIG. 2 is a block diagram of a computer connected to multiple displays in accordance with one aspect of the present invention.

FIG. 2 shows a block diagram in which a computer 200 (e.g., the computer 110) is connected to multiple displays $202_1, 202_2 \ldots 202_N$. Each of the displays 202 includes its own panel controller $204_1, 204_2 \ldots 204_N$. In the embodiment shown, the panel controllers 204 are connected to a display controller 206. As is further described below, the display controller 206 divides a single image frame provided by the computer 200 into multiple images for the multiple displays 202.

Although shown as separate components in FIG. 2, the display controller 206 and the panel controllers 204 may be combined in a single circuit board, or their functions may be distributed over a number of different components, or two or more of the controllers may be combined to form a single component, or the functions of two or more of the components may be spread over multiple elements on the same circuit board, multiple circuit boards, or may otherwise be provided. Similarly, unless otherwise stated herein, the components and elements used to describe the present invention are described as separate components for ease of description, and the functions of the components may be provided by several different devices or modules, and/or one or more of the components may be combined with another to form a single device or module.

In any event, a monitor signal interface 210 is attached to the display controller 206. A cable 214 extends between the monitor signal interface 210 and a host signal interface 212 connected to or otherwise associated with a display adapter 216 located in the computer 200.

A DAC, a digital transmitter sending a digital signal, such as TMDS (DVI) or LVDS, may be part of the host signal interface of this invention. Likewise, the monitor signal interface may alternatively be a digital receiver (e.g., configured to receive TMDS or LVDS).

The display adapter 216 may be a video graphics card, may be an adapter that is integrated, or may be another suitable component that enables a computer to provide display information to the displays 202. The display adapter 216 is connected to the operating system 134 for the computer 200 and may be utilized with one or more applications 135.

The displays 202 may each be a separate monitor having its own housing, or two or more displays sharing the same housing. One or more of the displays may be a cathode ray tube (CRT's), liquid crystal display (LCD), plasma, or another device that is capable of displaying graphics and/or text.

Figure 3:
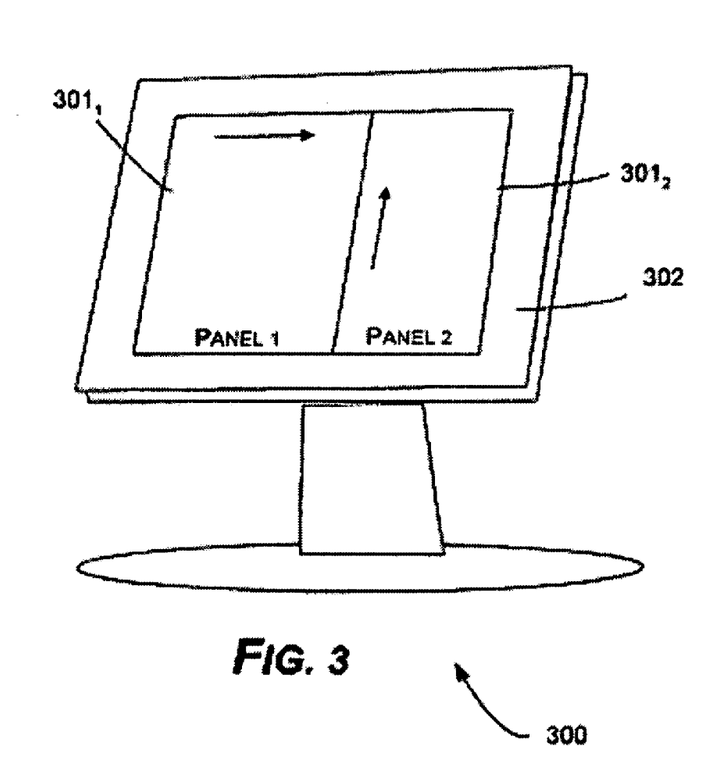
FIG. 3 is a side perspective view of a monitor having multiple display panels in accordance with one aspect of the present invention.

In accordance with one aspect of the present invention, the displays 202 may be provided by a monitor having separate panels that are aligned adjacent to one another so as to provide a single, contiguous display surface. An example of such a monitor 300 is shown in FIG. 3. The monitor 300 includes two panels $301_1, 301_2$, that together provide a single, large display surface within a single monitor housing 302. In such an embodiment, each display 202, as used herein would be one of the physical panels 301. This implementation of a multiple panel monitor is significantly less expensive than providing a single panel monitor of the same size, especially if the panels are of the LCD variety. In particular, multiple smaller LCD panels can be less expensive than a single large panel LCD because smaller LCD panels may be produced with better production yields than a larger panel of the same composite size.

If the displays 202 are separate monitors or otherwise require or include their own external cable, then the display controller 206 may be provided, for example, in a box having a single input connection for the cable 214 and multiple output connections for the cables for the separate monitors. Other arrangements may be provided, such as where the display controller 206 is provided on or in one primary monitor, the primary monitor is directly connected to the cable 214, and the other monitors are connected to the primary monitor.

In accordance with one aspect of the invention, the display controller 206 provides custom Extended Display Identification Data ("EDID 208", FIGS. 2 and 4) information to the computer 200 regarding the displays 202. As is known, EDID is a Video Electronics Standards Association ("VESA") standard data format that contains basic information about a monitor and its capabilities, including vendor information, maximum image size, color characteristics, factory preset timings, frequency range limits, and character strings for the monitor name and serial number. Typically, the EDID information is stored in the monitor and is provided to a computer when the monitor is connected to the computer. Computers can use the EDID information for video configuration purposes, so the monitor and system can work better together.

In the present invention, the display controller 206 provides the EDID 208, which includes custom information regarding the displays 202. In accordance with the present invention, as shown diagrammatically in FIG. 4, the EDID 208 includes single display information 402 and multiple display information 404. The single display information 402 includes information regarding the total combined display surface provided by the displays 202. This information may include the possible resolutions of the combined display surface, as well as refresh rates and other information regarding use of the combined display surface. As an example, the combined surface may include two XGA displays having a resolution of 768×1024, with the combined display surface resolution being 1536×1024. As another example, two XGA landscape displays, each having a resolution of 1024×768 may be combined to form a combined display surface resolution of 2048×768. In addition, a landscape display and a portrait display may be combined, such as an SXGA landscape display having a resolution of 1280×1024 and an XGA portrait display having a resolution of 768×1024. These combined displays would have a resolution of 2048×1024.

The combined display surface should be rectangular to make most efficient use of bandwidth and buffers. However, as can be seen from these above examples, many different combinations may be utilized to provide a rectangular, combined display surface.

Figure 4:
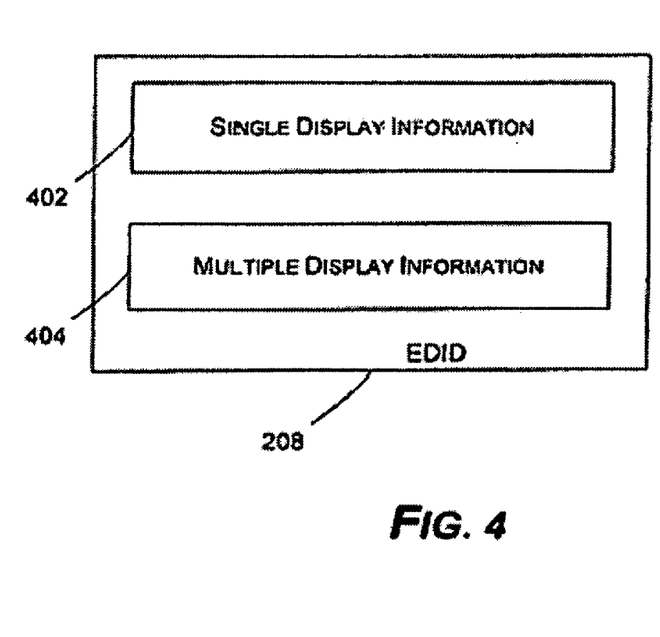
FIG. 4 is block diagram representation of EDID information that may be provided by a display controller of the present invention.

In addition to the single display information 402, the EDID 208 includes multiple display information 404. Multiple display information 404 includes characteristics of the physical layout of the displays 202, as well as resolution, refresh rate and other information regarding the particular displays.

Figure 5:
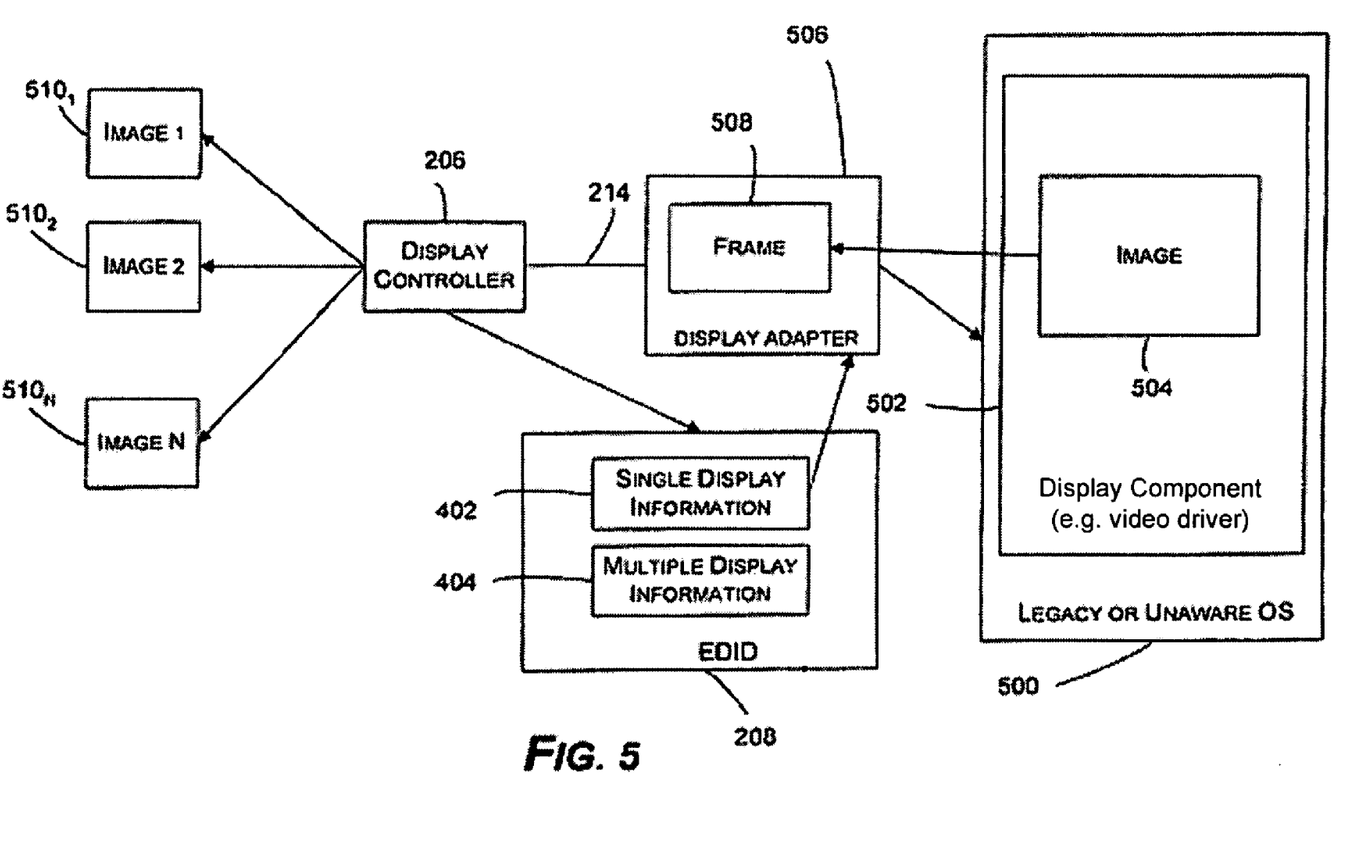
FIG. 5 is a block diagram illustrating a manner by which the present invention may be incorporated with legacy and unaware operating systems.

The single display information 402 and the multiple display information 404 permit the displays 202 to work on legacy or unaware operating systems, as well as operating systems which can recognize the multiple display information 404. By "unaware," we mean that the operating system is not familiar with the multiple display information, and is not configured to modify its behavior (e.g., configure a driver for the display adapter) in response to receiving the multiple display information. Likewise, an "aware" operating system is a operating system that is familiar with the multiple display information, and is configured so that it may modify its behavior in response to receiving the multiple display information. As shown in FIG. 5, legacy and unaware operating systems 500 utilize the single display information 402 to configure a display component 502 (e.g., a video driver) of the operating system 134 to treat the combined displays as a virtual single display image 504. The single display image 504 is provided to the display adapter 506. The display adapter 506, in turn, creates a frame 508, for example in a frame buffer (e.g., the frame buffer 220), which is sent through the cable 214 to the display controller 206. The display controller 206 splits the frame 508 into separate images $510_1, 510_2 \ldots 510_N$, each image representing the region of the particular display 202 on the single, combined display surface.

Because the legacy or unaware operating system 500 is not aware of the actual boundaries between the displays 202, applications 135 and the operating system 134 do not take advantage of the layout or capabilities of the multiple displays, and individual panels, applications or popup windows may be shown over any one of the displays 202. However, by providing the single display information 402, the displays 202 are still operational with legacy and unaware operating systems.

Figure 6:
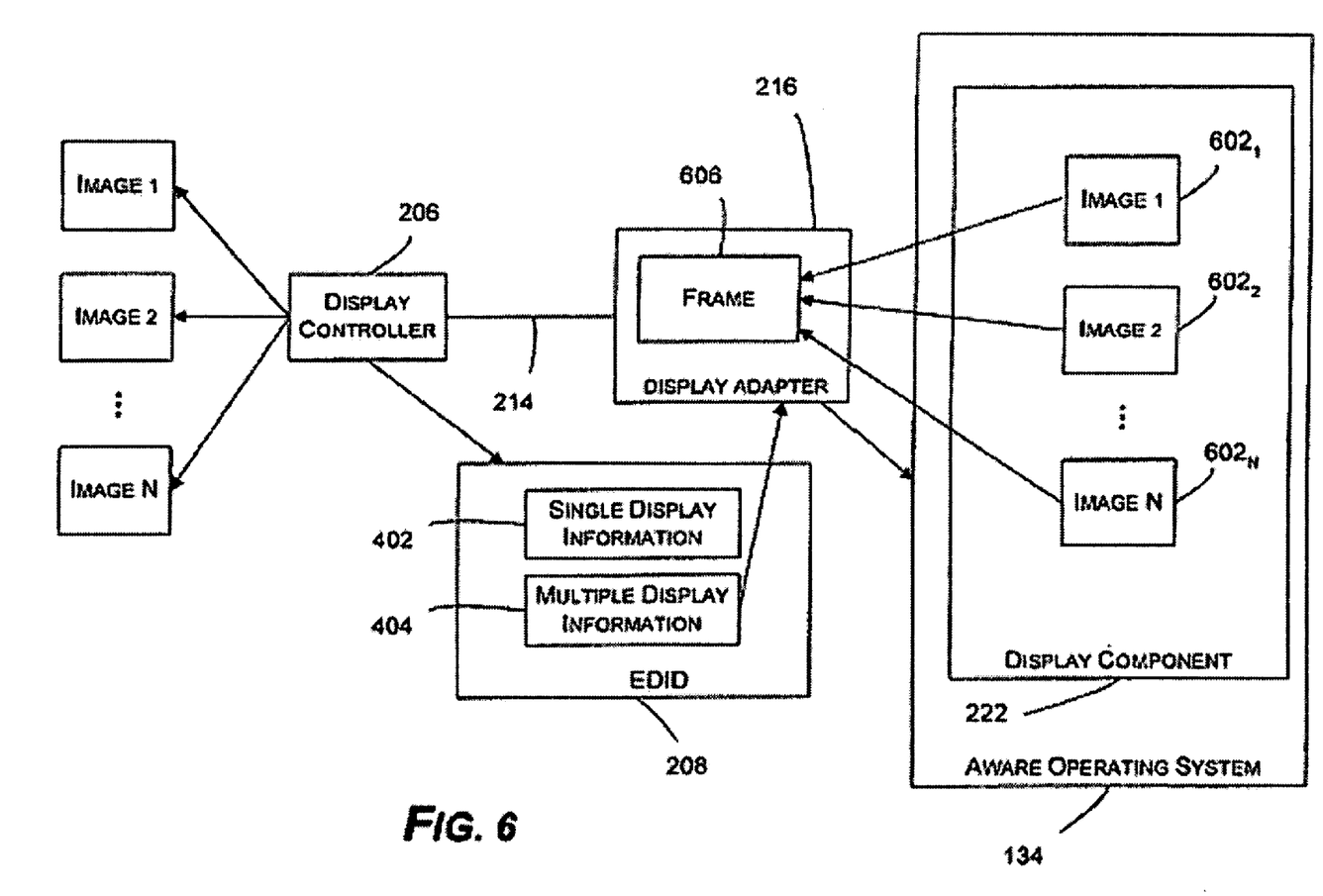
FIG. 6 is a block diagram illustrating components for providing targeted image information to multiple displays in accordance with one aspect of the present invention.

Turning now to FIG. 6, for an operating system 134 that is aware of the present invention, a display component 222 (also shown in FIG. 2) of the operating system 134 may utilize the multiple display information 404 to partition panes of an image into separate virtual images that represent the location and size of the displays 202. These virtual images $602_1, 602_2 \ldots 602_N$ are combined to form a single frame 606 within the frame buffer 220 associated with the display adapter 216.

Figure 7:
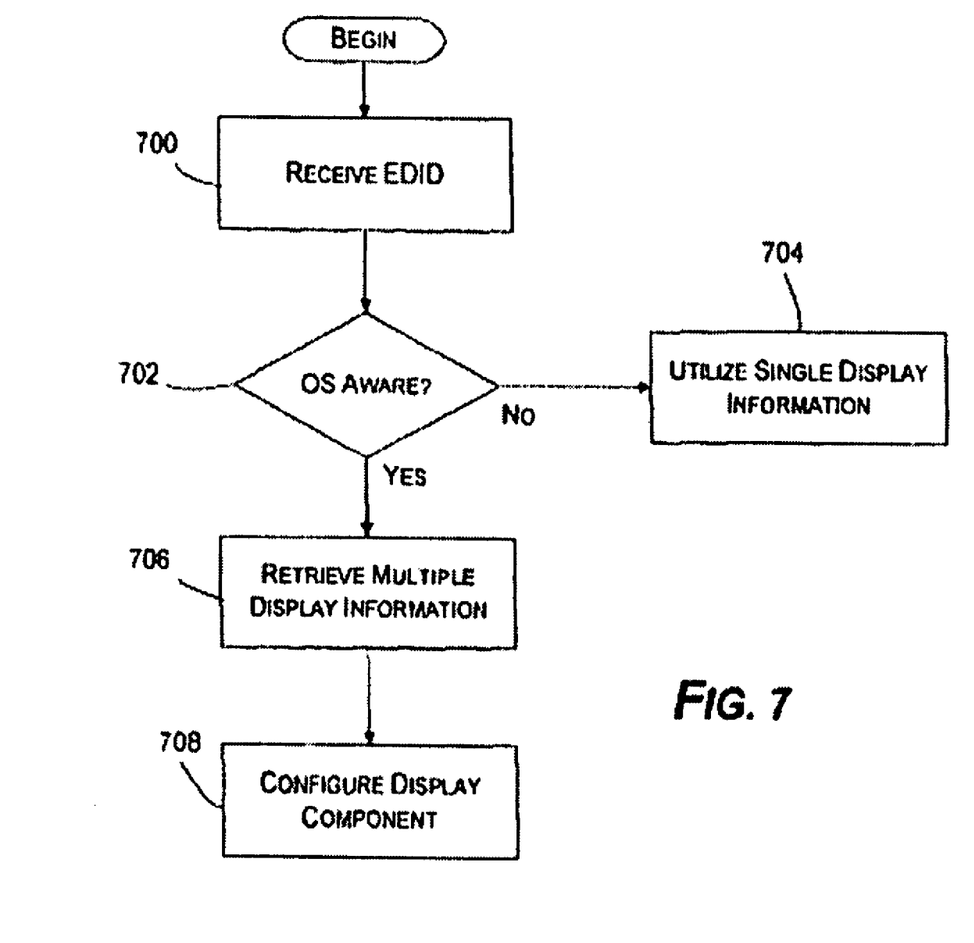
FIG. 7 is a flow diagram generally representing steps for configuring a display component for the computer shown in FIG. 2 in accordance with one aspect of the present invention.

FIG. 7 is a flow diagram generally representing steps for configuring the display component 222 so that the operating system 134 and/or applications 135 may optimize display quality and presentation on the displays 202 in accordance with one aspect of the present invention. Beginning at step 700, the customized EDID 208 is received by the operating system 134.

At step 702, if the operating system 134 is not familiar with the multiple display information 404, the process branches to step 704, where the single display information 402 is utilized by the computer 200. That is, the computer 200 configures the video driver or the available display component 502 for the operating system 134 to expose a single monitor of the resolution defined in the single display information 402.

If the operating system 134 does include the display component 222, then step 702 branches to step 706, where the multiple display information 404 is retrieved. At step 708, the display component 222 is configured to expose the number of displays 202 at the resolutions defined by the multiple display information 404. In this manner, the layout of the image may be appropriately optimized for separate physical panes. Applications, such as the applications 135, may utilize this feature. To this end, the display component 222 may, for example, expose an application programming interface 224 (FIG. 2) that the applications 135 may call upon to be provided the mapping of the images 602 so that the applications may optimize display quality and presentation by directing separate physical panes or windows to be rendered in a particular display 202.

Figure 8:
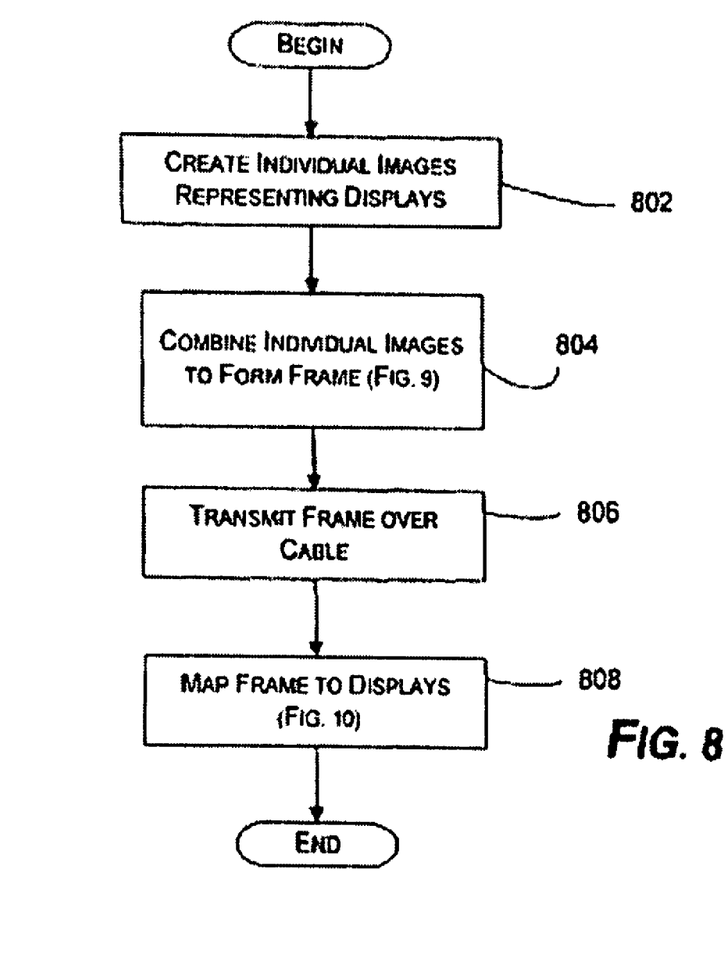
FIG. 8 is a flow diagram generally representing steps for targeting display information to particular displays in accordance with one aspect of the present invention.

One of the advantages of the present invention is that the display controller 206 and the display component 222 permit a single cable 214 and a conventional display adapter 216 having only one cable plug to be used with multiple displays 202. To this end, FIG. 8 is a flow diagram generally representing steps for targeting display information at the display component for particular displays 202 utilizing the single cable 214. Beginning at step 802, one of the applications 135 and/or the operating system 134 creates individual images 602 targeted to one or more of the displays 202. At step 804, the images 602 are combined in the display adapter 216 to form the frame 606 in the frame buffer 220. Conventional display adapters are capable of handing such frames, and thus no modifications have to be made to a conventional display adapter for it to work with the present invention. The process of combining the images is further described with FIG. 9, below.

The frame 606 is transmitted over the cable 214 at step 806. Again, this operation is normal for a VGA or DVI cable, and thus no modifications are needed to the cable 214 for the transmission to occur.

At step 808, the display controller maps regions of the frame 606 to physical displays 202. Because the frame 606 was formed from the images 602 as instructed by the display controller 206 (i.e., via the EDID 208), the regions exactly align with the displays 202. In this manner, the operating system 134 and/or the applications 135 may optimize display quality and presentation on the displays 202. The mapping process is further discussed with FIG. 11, below.

As can be understood with reference to FIG. 8, the operating system 134 and the applications 135 create video display information for multiple displays even though the display adapter 216 is capable of sending only a single image or frame, and the cable 214 is capable of transmitting only a single image or frame under the existing VESA standards. The display controller 206 is aware of how the frame 606 is arranged, because it has instructed the operating system, via the EDID 208, on how to provide image data to the display adapter 216. Thus, knowing that the image data is in the appropriate location within the frame 606, the display controller 206 may appropriately map the combined image to the displays 202.

The splitting of the frame 606 by the display controller 206 may be done in a number of different ways. As an example, the display component 222 may physically separate the frame 606 or 508 in virtual memory, and expose the physically-separated sections of memory for applications or the operating system to write images to the respective displays 202. The separated sections are then combined to provide information to the display adapter 216 so that it may form the frame 606. Although such an implementation may work, this particular example is processor and memory intensive, and another solution may utilize interleaving of information for different displays 202. Such an example is described with reference to FIG. 9.

Figure 9:
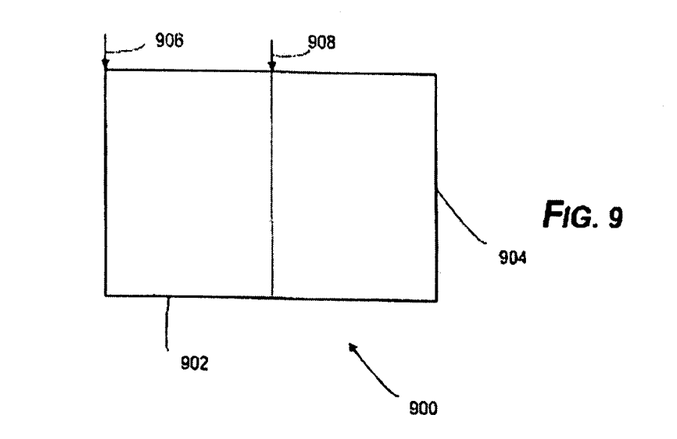
FIG. 9 is a representation of virtual frame data storage by the display component of the present invention.

FIG. 9 shows a two-dimensional representation of memory storage for a single virtual image 900. In the example, the single virtual image 900 is divided into two virtual images, 902 and 904. As is described further below, the single virtual image 900 represents the combined image data for the display surface, and may be, for example, similar to the data representation that is used by the frame buffer 220 to create a frame of image data information for transmitting to the display controller 206. The separate virtual images 902 and 904 include two sets of data that combine to form the single virtual image 900. In this particular example, the two virtual images 902 and 904 are stored in memory as alternating segments of the single virtual image 900. As further described below, the virtual images 902 and 904 may each be defined as a separate bitmap so that individual applications may write to the separate virtual images 902 and 904. This feature permits data to be properly stored as one image (i.e., the single virtual image 900), but permits applications to write to individual frames for the displays 202.

Each of the virtual images 902, 904 includes pointers 906, 908 and a corresponding delta (not shown, but known in the art of frame buffers and bitmaps). As is known, one conventional manner of storing a Device Independent Bitmap (DIB) is to store a pointer for a starting location in memory for the bitmap, as well as a delta value which represents the beginning of the next scan line for the bitmap. Very often, the delta is larger than the width of the bitmap and there may be extraneous data beyond the end of the width of the bitmap.

The present invention takes advantage of this feature by defining the first delta as being large enough to encompass the data for the second frame 904 in its extraneous data. Likewise, the second delta is large enough so that the information for the first frame 902 is included in the extraneous data for the second frame 904. For the virtual image 902, the pointer 906 begins at the same location that data begins for the single virtual image 900. The delta for the virtual image 902 is greater than the width of the first frame 902 and the second frame 904. Similarly, for the second frame 904, the pointer 908 is located at the beginning of the second frame, and the delta for that frame is greater than the width of the first and second frames 902, 904.

As an example, the first pointer 906 may point at the position "1," the first virtual image 902 may have a width of 100 pixels and a delta of 220. The second pointer 908 may point at the position "101," and the second virtual image 904 may have a width of 110 pixels, and a delta of 220. In this example, the first 100 pixels of data for the single virtual image 900 would be within the first virtual image, and the remaining 120 bits of information, which includes the first 110 pixels of data for the second virtual image 904, would be considered extraneous data for the first virtual image. Similarly, the first virtual image's data would be considered extraneous data for the second virtual image 904. This pattern continues for each corresponding line of data in the single virtual image.

Figure 10:
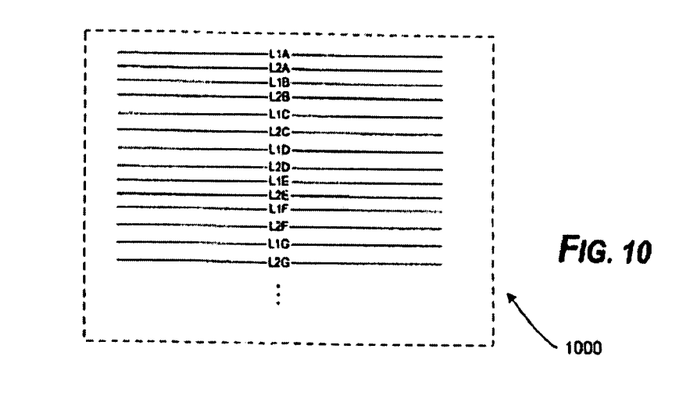
FIG. 10 is two dimensional representation of data storage by the display component of the present invention.

Ultimately, a two-dimensional representation of the data in memory may look like the representation 1000 shown in FIG. 10, wherein a first line of data L1A is the pixel information for the first frame 902 (in the example above, bits 1 to 100 of information), and a second line of data L2A is pixel information for the first line of the second frame 904 (in the example above, bits 101 to 210 of information), a third line of data L1B is pixel information for the second line of the first frame 902 (bits 221 to 320), a fourth line of data L2B is pixel information for the second line of the second frame 904 (bits 321 to 430), and so forth. The extra data that is not a part of either frame 902 or 904 (e.g., bits 211 to 220 and 431 to 440) may be presented at the end of the lines for the second frame 904.

The interlacing scheme just described permits an application 135 or the operating system 134 to write to one of the, virtual images 902, 904 by using the corresponding pointer 906 or 908 and its delta. The data may then be provided to the display adapter 216 as shown in FIG. 10, permitting the display adapter to efficiently write the virtual image 220. This feature thus exposes two separate "displays," even though the displays are in reality portions of the single virtual image 900.

In this manner, applications may be led to believe that there is an actual frame that is available for each of the individual displays 202. Thus, all the operating system 134 or the display component 222 has to store is the pointer (e.g., 906 or 908) for each virtual image, the width of the virtual image, and the delta information for each of the displays 202. The data written by the applications 135 or the operating system 134 is written in a representation as is shown in FIG. 10, which may directly be provided to the display adapter 216 so that it may build the single frame 606 within the frame buffer 220.

Figure 11:
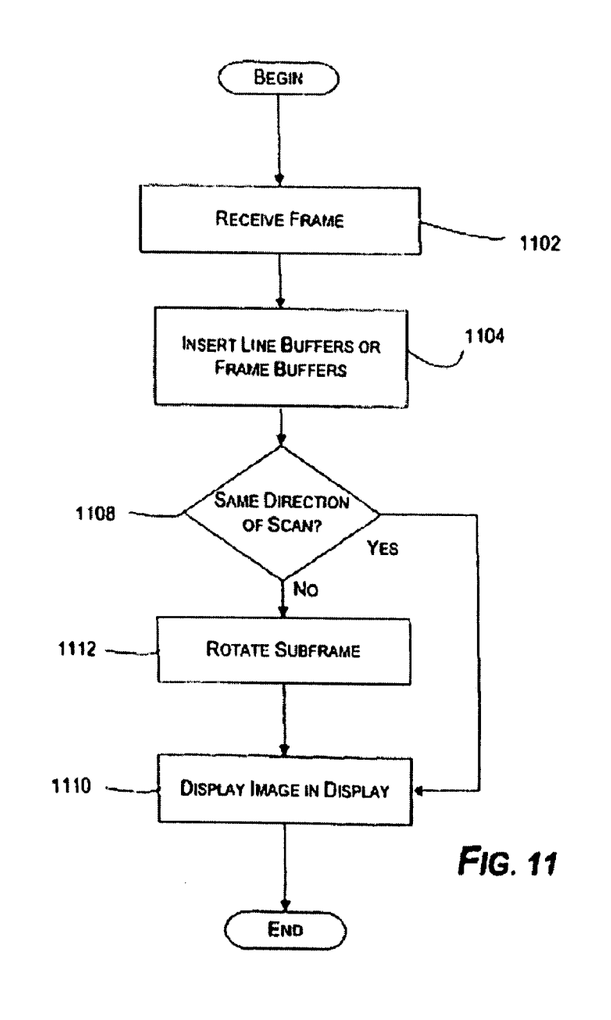
FIG. 11 is a flow diagram generally representing steps for mapping an image frame to multiple displays in accordance with one aspect of the present invention.

FIG. 11 is a flow diagram generally representing steps that the display controller 206 undergoes to map the frame 606 or 508 to the displays 202 in accordance with one aspect of the present invention. Beginning at step 1102, the display controller 206 receives the frame 606 or 508. The display controller 206 then inserts line buffers or frame buffers into the frame 606 at step 1104. The line or frame buffers separate the image data between frames that target different displays. As is known, a buffer is a temporary storage unit. In this case, the buffer (line or frame) temporarily stores video information, pixel by pixel, for the particular line or frame.

As an example, if the displays 202 include two or more portrait-aligned panels attached along the edges, the display controller may insert line buffers at locations where a first panel ends and a second panel begins. That is, the line buffers are inserted between adjacent horizontal rows of pixels for each of the panels. Using the example previously described with FIG. 9, a first line buffer may be the first 100 bits of image data, and a second line buffer may be the next 110 bits of image data. These lines may be sent to the respective first and second displays, and the process may continue, for example by sending lines 221 to 320 to first display, lines 321 to 430 to the next display, and so forth.

(0065) At step 1108, a determination is made whether the display scans in the same direction as the frame 606. If so, then step 1108 branches to step 1110, where the image (a "subframe" of the frame) for the display 202 is displayed. If not, then step 1108 branches to step 1112, where the subframe for the image of that display is rotated. That is, the linear information regarding the pixels is changed so that it reads in scanning order. For example, if the pixels in the frame 606 were stored in a linear horizontal fashion, the pixel information is stored representing horizontal rows of the frame, with a lower row following a higher row. If the display 202 corresponding to a frame scans in a vertical direction, the pixel information would need to be reordered so that it is stored representing vertical columns of the frame. This reordering of the pixels would result in a "rotation" of the frame. Rotating the frame is one way of permitting a portrait-aligned display to be mounted adjacent to a landscape-aligned display, such as the two panels 301 shown in FIG. 3.

After the frame has been rotated, step 1112 branches to step 1110, where the frame is displayed in the appropriate display 202. The process then ends for that frame.

The present invention provides a unique solution for delivering image information for multiple displays through a single cable 214 and a single display adapter 216 having only one plug for a cable. The EDID 208 is used to communicate to the operating system 134 the layout and resolution of the displays 202. The operating system 134 and/or the applications 135 may then structure their image data so that the image data may be directed to the appropriate display or displays 202. Because the image data structure has been communicated by the display controller 206 (i.e., via the EDID), the display controller 206 may appropriately map the frame 606 from the display adapter 216 to the appropriate displays 202.

The use of a single display adapter 216 saves the cost of additional display adapters. In addition, multiple panels may be provided in a single monitor as a system to optimize alignment and minimize the seams between the displays, enabling a default panorama effect that contributes to an immersive visual experience for users.

Other variations are within the spirit of the present invention. Thus, while the invention is susceptible to various modifications and alternative constructions, a certain illustrated embodiment thereof is shown in the drawings and has been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

What is claimed is:

1. A computer-readable medium having computer executable instructions for carrying out a method, the method comprising:

receiving, at a host computer, display information from a display controller being separate from the host computer and connected to a plurality of displays that form a combined display surface, the display information comprising multiple display information and single display information, the display information including the location of each of the plurality of displays in the combined display surface; wherein:

said host computer comprises an operating system being one of configured to be responsive to said multiple display information and configured to be responsive to said single display information;

if the operating system is configured to be responsive to the multiple display information:

exposing portions of memory at the host computer representing each of the plurality of displays in accordance with the multiple display information;

receiving image data for each portion of memory; and combining the image data for each portion of memory to form a frame of image data at the host computer; and if the operating system is configured to be responsive to the single display information, treating the plurality of displays as a single virtual display.

2. The computer-readable medium of claim 1, wherein the image data is combined in a single display adapter at the host computer.

3. The computer-readable medium of claim 2 having further computer-executable instructions comprising dividing the single frame into a plurality of subframes at the display controller and according to the multiple display information, and providing the plurality of subframes to the respective displays.

4. The computer-readable medium of claim 3 having further computer-executable instructions for rotating at least one of the subframes prior to providing the subframes.

5. The computer-readable medium of claim 1 having further computer-executable instructions comprising transmitting the frame of image data from the host computer to the display controller.

6. The computer-readable medium of claim 5, wherein the frame of image data is transmitted via a single cable.

7. The computer-readable medium of claim 6, wherein the single cable is a video graphics array (VGA) or a digital video interactive (DVI) cable.

8. The computer-readable medium of claim 5, wherein the display adapter comprises a single video cable plug, and wherein single frame of image data is transmitted via the single video plug.

9. A computer-readable medium having computer-executable instructions comprising:

sending display information from a display controller to a computer separate from the display controller, the display controller being connected to a plurality of displays that form a combined display surface, the display information including the location of each of the plurality of displays in the combined display surface, the display information comprising multiple display information and single display information; wherein:

said computer comprises an operating system being one of configured to be responsive to said multiple display information and configured to be responsive to said single display information;

if the operating system is configured to be responsive to the multiple display information:

receiving at the display controller a frame of image data from the computer, the frame of image data being created according to the multiple display information;

dividing the single frame into a plurality of subframes at the display controller and according to the multiple display information; and providing the plurality of subframes to the respective displays; and if the operating system is configured to be responsive to the single display information, treating the plurality of displays as a single virtual display.

10. The computer-readable medium of claim 9 having further computer executable instructions for rotating at least one of the subframes prior to providing the subframes.

11. A computer-readable medium having computer-executable instructions comprising:
in a computer connected to a plurality of displays that form a combined display surface, receiving information regarding the plurality of displays, the information including:
first information about the plurality of displays, the first information including information about the location of each of the plurality of displays in the combined display surface and the resolution of each of the plurality of displays; and
second information about the plurality of displays, the second information including resolution of the combined display surface;
if the computer is aware of the first information, configuring video memory for the computer to expose portions of memory representing each of the plurality of displays in accordance with the first information; and
if the computer is not aware of the first information, configuring video memory for the computer in accordance with the second information to expose memory that represents the combined display surface.

12. The computer-readable medium of claim 11, wherein exposing portions of memory representing each of the plurality of displays in accordance with the first information comprises interleaving the separate portions of memory so that the separate portions of memory represent a virtual frame of image data.

13. A computer system comprising:
a computer for receiving display information from a display controller, the display information comprising multiple display information and single display information; a monitor comprising:
a first panel configured to scan horizontally; and
a second panel adjacent said first panel, said second panel configured to scan vertically;
said display controller coupled to said monitor and configured to split a frame received from a display adapter into first and second subframes for the first and second panels, respectively; said display controller being configured to rotate at least one of said subframes, wherein:
said computer comprises an operating system being one of configured to be responsive to said multiple display information and configured to be responsive to said single display information;
if the operating system is configured to be responsive to the multiple display information:
the computer exposes portions of memory representing each of the plurality of displays in accordance with the multiple display information;
the display controller receives image data for each portion of memory and combines the image data for each portion of memory to form a frame of image data at the host computer; and
if the operating system is configured to be responsive to the single display information, the display controller treats the plurality of displays as a single virtual display.

14. A system in accordance with claim 13, further comprising a video driver coupled to said computer, wherein if said operating system is configured to be responsive to said display information, said video driver is configured in accordance with said display information.

15. A method for providing display information, said method comprising:
providing to a computer, display information indicative of a location of each of a plurality of displays of a combined display surface, the display information comprising multiple display information and single display information, wherein:
said computer comprises an operating system that is one of configured to be responsive to said multiple display information and configured to be responsive to said single display information;
if the operating system is configured to be responsive to the multiple display information:
storing at least a portion of said display information in memory of said computer, wherein, said display information associated with each of said plurality of displays is stored in a respective portion of said memory;
receiving image data associated with each portion of said memory; and
combining said image data to form a frame of image data; and
if the operating system is configured to be responsive to the single display information, treating the plurality of displays as a single virtual display.

16. A method in accordance with claim 15, further comprising providing said frame of image date for rendering via said plurality of displays of said combined display surface.

17. A method in accordance with claim 15, further comprising:
dividing said frame of image date into a plurality of subframes respectively associated with said plurality of displays; and
providing said plurality of subframes for rendering via said respective plurality of displays.

18. A method in accordance with claim 17, further comprising rotating at least one of said plurality of subframes prior to performing said act of providing said plurality of subframes.

19. A method in accordance with claim 15, further comprising:
configuring a video driver in accordance with said display information, if said operating system is configured to be responsive to said display information.

* * * * *